United States Patent [19]
Jackson et al.

[11] Patent Number: 6,062,106
[45] Date of Patent: May 16, 2000

[54] SIDE LOAD SENSOR

[76] Inventors: David C. Jackson, 9260 Broken Arrow Expressway, Tulsa, Okla. 74147-1617; James D. Musshafen, 5868 S. Hudson Pl., Tulsa, Okla. 74147-1617

[21] Appl. No.: 09/067,193

[22] Filed: Apr. 27, 1998

[51] Int. Cl.$^7$ ..................................................... F16H 37/06
[52] U.S. Cl. .............................. 74/724; 212/155; 212/247
[58] Field of Search ............................... 74/724; 411/531, 411/533, 534; 212/247, 155, 154; 73/118.1, 118.2

[56] References Cited

U.S. PATENT DOCUMENTS

| | | | |
|---|---|---|---|
| 4,286,479 | 9/1981 | Baumann et al. | 74/724 |
| 5,163,570 | 11/1992 | Mundis et al. | 212/155 |
| 5,590,968 | 1/1997 | Dretzka | 384/563 |

*Primary Examiner*—Charles A Marmor
*Assistant Examiner*—Tisha D. Waddell

[57] ABSTRACT

A side load sensor is provided for sensing the longitudinal load on a rotary worm which is used to rotate a turret on a utility vehicle and wherein a boom is mounted on the rotatable turret. The load sensor includes a gear housing mounted on the turret for supporting a worm shaft for rotation about a horizontal axis, the worm being disposed centrally on the worm shaft. The bearing housing also includes a pair of spaced gear mounts for supporting the ends of the worm shaft and a worm gear disposed for rotation around a vertical axis. A motor is provided for rotating the worm shaft, the worm being arranged in driving relation with the worm gear. A sleeve is mounted at each end of the worm shaft for movement with the worm shaft in response to longitudinal forces transferred back from the worm gear to the worm. A polyurethane ring is mounted adjacent each end of the worm shaft and disposed between a flat surface on the adjacent sleeve and a flat surface on the associated bearing mount so that a polyurethane ring is compressed between a sleeve and its adjacent bearing mount depending upon the direction of the force exerted by the worm gear against the worm. A slidable spool is mounted in a spool bore in one of the gear mounted and connects with the sleeve. The spool is responsive to the compression of the polyurethane ring so as to sound an alarm signal and/or to shut off the motor which drives the worm shaft when the compression exceeds a predetermined valve.

4 Claims, 6 Drawing Sheets

SIDE LOAD SENSOR

BACKGROUND OF THE INVENTION

1. Field of the Invention

This invention pertains to load sensing devices, and more particularly, to sensing devices used to detect an overload condition on a gear used to rotate an upper structure mounted on a vehicle.

2. Background of the Invention

The problems associated with cranes and other types of lifting devices mounted on vehicles have long been recognized. In particular, problems associated with overloading by swinging the boom to the sides of the vehicle and in pulling articles with the boom can result in failure of the boom. Typical situations in which an overload on the boom may occur are when the vehicle is on sloped terrain while the boom is being articulated, when the boom being articulated strikes an object to the side of the vehicle, and when the boom, extended to the side of the vehicle, is used to pull a load, either by forward movement of the vehicle or by continued articulation of the boom. Once the boom has been overloaded, the operator typically does not have sufficient time to shutoff power to the lifting device or to the gear that rotates the boom to prevent the dangerous conditions.

Lifting devices which include mechanical means for shutting off the power to the lifting device and/or sending a signal to the operator in the event of an emergency are disclosed in U.S. Pat. Nos. 4,625,946 and 2,300,343 and Great Britain Patent No. 950,003. A More recent side load sensing device which includes means for shutting off the power is disclosed in U.S. Pat. No. 5,163,570, issued to Mundis et al on Nov. 17, 1992. The Mundis et al patent operates on a hydraulic principle; when the worm is subject to a thrust along its axis, in either direction, an increase in hydraulic fluid pressure sends a signal and/or terminates input power to the worm. Other patents of interest are U.S. Pat. Nos. 5,597,080; 5,557,526 and 5,359,516.

SUMMARY OF THE INVENTION

It is an object of the present invention to provide a sensing means that will readily detect an overload of force on the worm of a worm/worm wheel gear arrangement resulting from an overload condition on a boom mounted on a vehicle.

Still another object of the present invention is to provide a side mounting for the worm which includes a pair of polyurethane rings or gaskets, the compression of which will accurately sense an overload of a worm/worm wheel gear arrangement.

The foregoing objects are achieved by providing a sensing means at each end of the worm. The worm is mounted so that a polyurethane ring, at each end of the worm, is compressed between a portion that moves with the worm and a portion of a stationary bearing mount at each end of the worm. A member which moves with the worm is adapted to contact a spool valve which is thus moved longitudinally in response to the compression of either polyurethane ring. The spool contacts a ball which is received centrally with respect to the spool valve such that, if the spool valve moves longitudinally in response to the longitudinal movement of the worm, the ball will be moved away from the spool valve to contact an actuator rod which, in turn, will actuate a solenoid or other sensing device and/or turn off the power to the worm or to any other portion of the system.

DETAILED DESCRIPTION OF THE PREFERRED EMBODIMENTS

Figure 1:
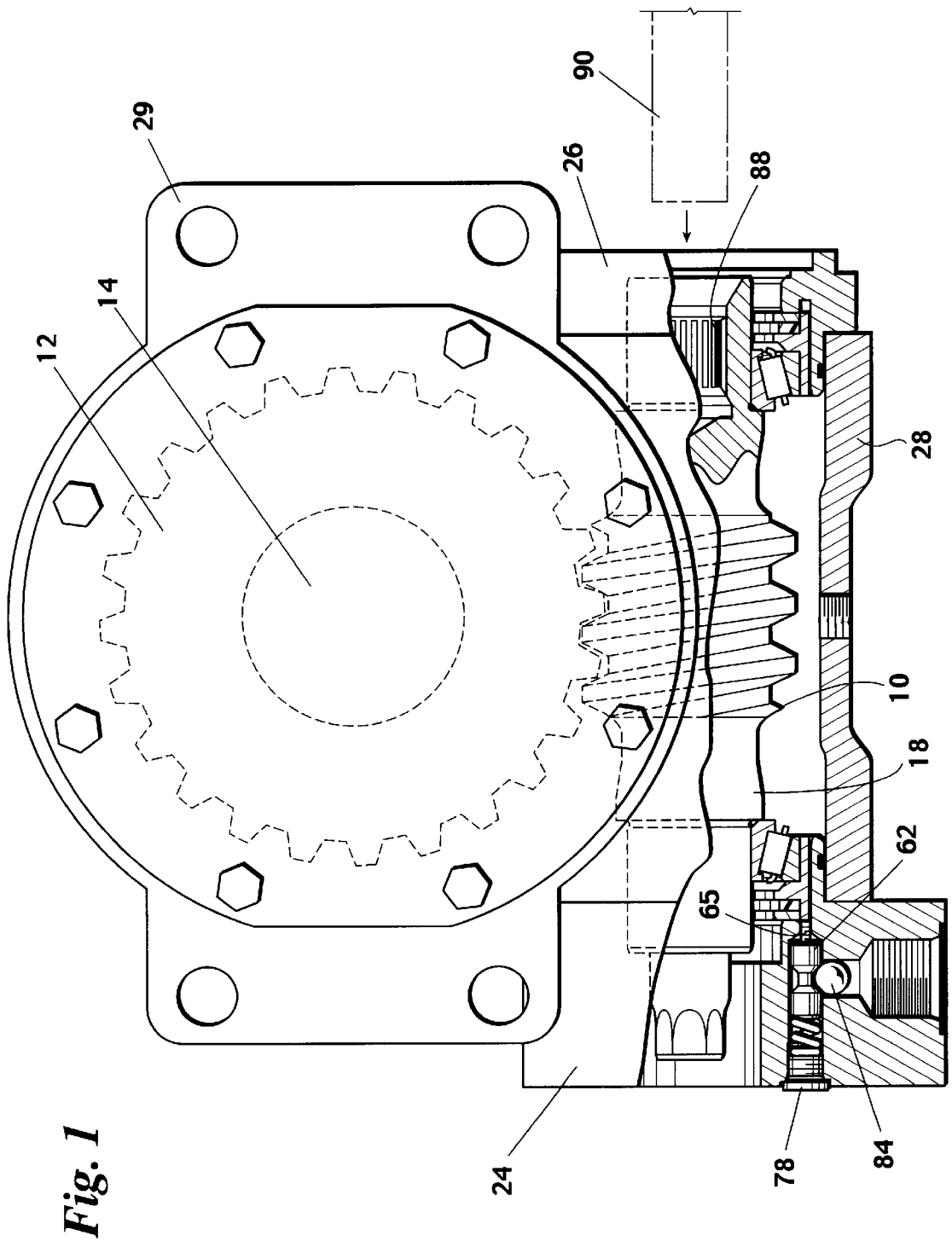
FIG. 1 is a plan view of the worm/worm gear drive of the present invention including associated structure, with some parts broken away and in section which is adapted to be mounted on a turret which, in turn, is mounted on the rear of a utility truck of the type which carries a crane and/or boom.
Figure 2:
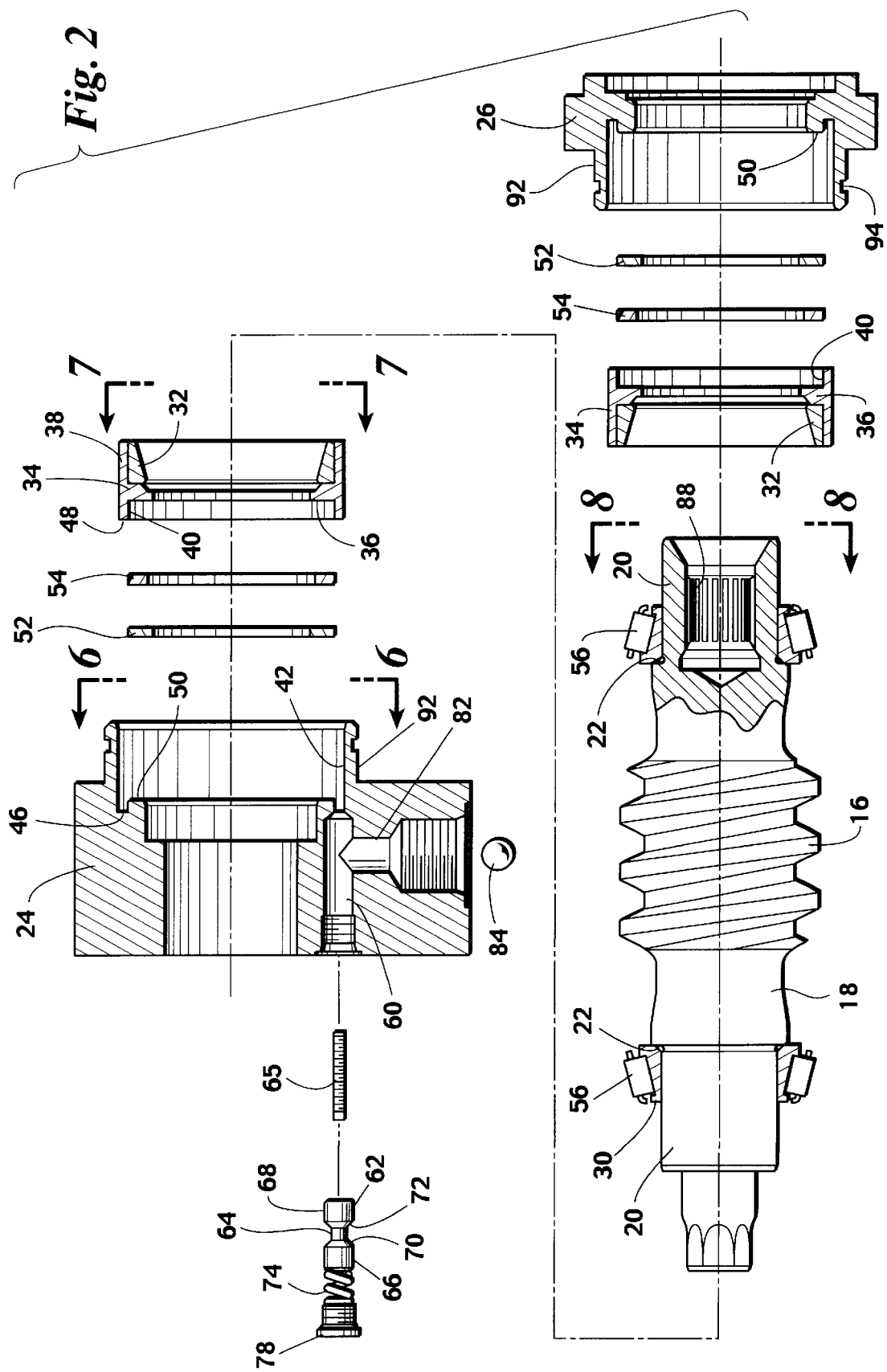
FIG. 2 is an exploded view, with some parts in section, of the worm and its associated mounting structure shown in FIG. 1.
Figure 3:
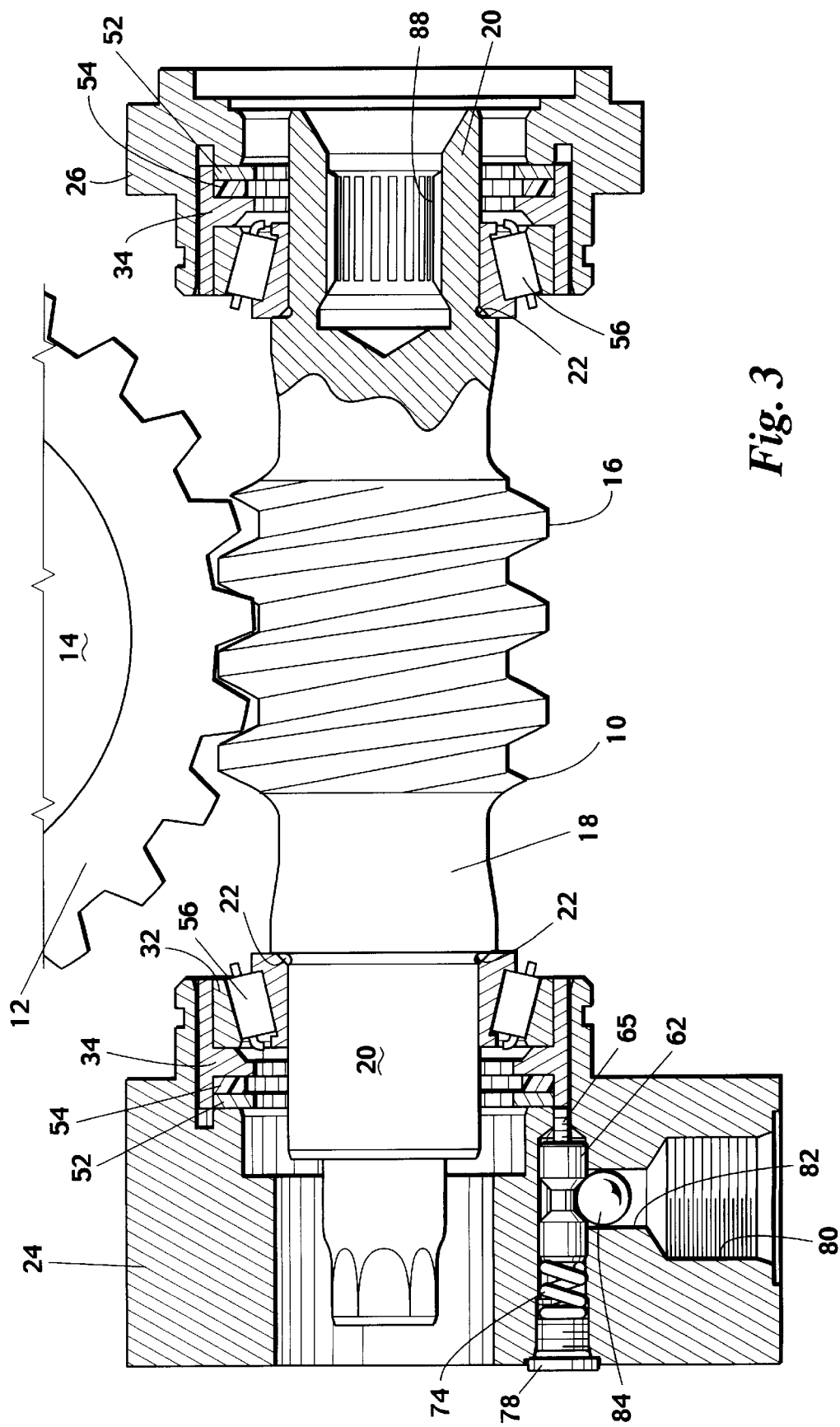
FIG. 3 is an enlarged sectional view, taken from FIG. 1, and showing further details of the worm and associated mounting therefore.

Referring to drawings in detail, FIGS. 1 to 3 show a worm 10 disposed in driving relation with a worm gear 12 which, in turn, drives a vertical shaft 14 which indirectly turns a rotatable turret (not shown) or table mounted on a vehicle such as, for example, a cherry picker (not shown). A lifting device (not shown) including a crane or crane boom (not shown) is mounted on the turret. As the worm 10 turns on a horizontal axis, the intermating worm gear 12 will rotate around a vertical axis so as to turn the shaft 14 also around a vertical axis. The entire structure shown in the drawings is preferably mounted on the turret (not shown) referred to above such that the shaft 14 will project downwardly beneath the turret so as to turn a pinion (not shown) which in turn engages a rack (not shown) secured to the vehicle. Thus, when the shaft 14 rotates in response to the movement of the worm and worm gear, the turret will rotate with respect to the vehicle (not shown).

Figure 5:
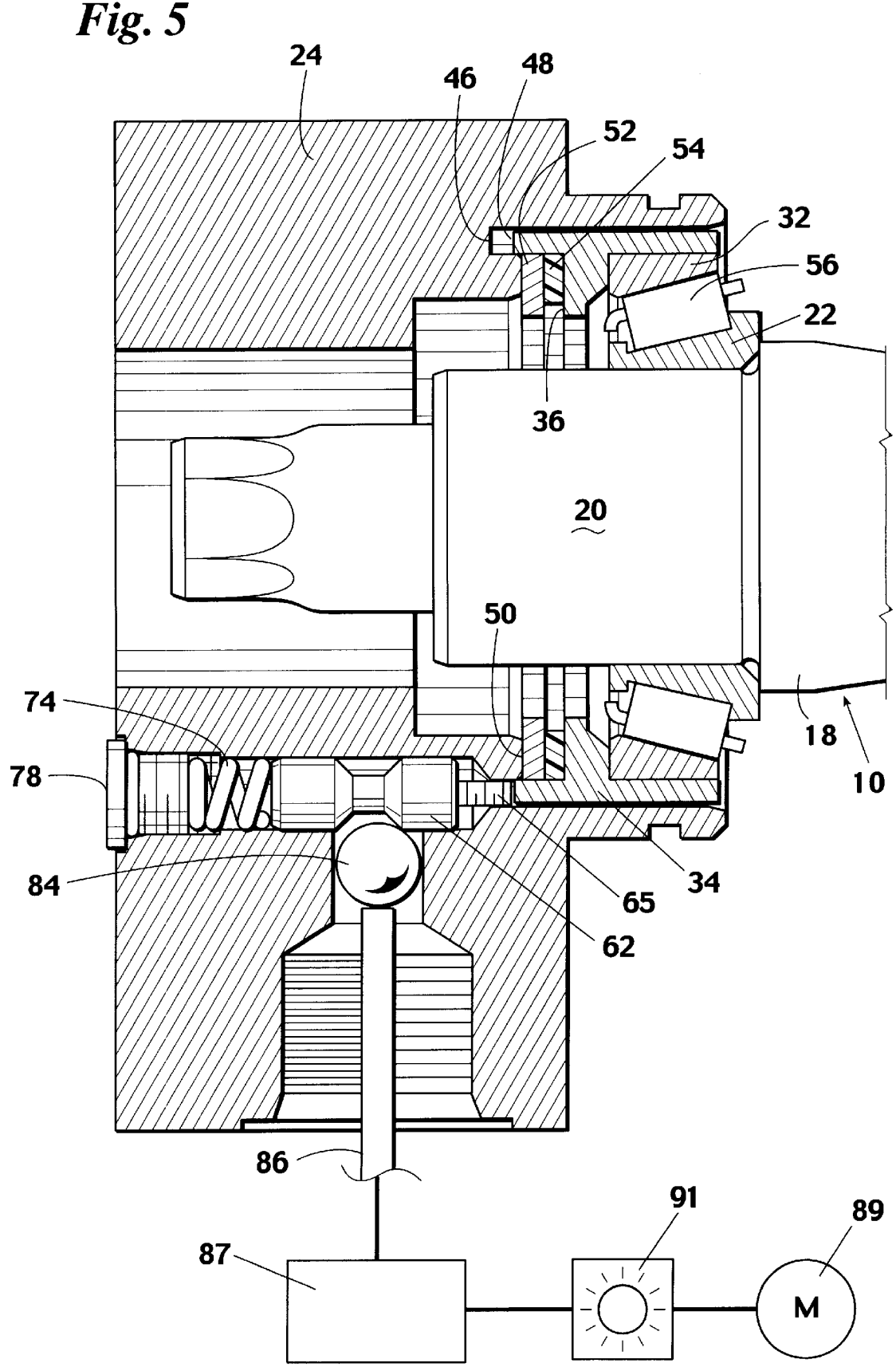
FIG. 5 is a view substantially identical to FIG. 4 except that the worm has been placed under a sufficient force to the left so as to compress the polyurethane ring, thereby causing a ball to move downwardly to depress an actuator rod.
Figure 7:
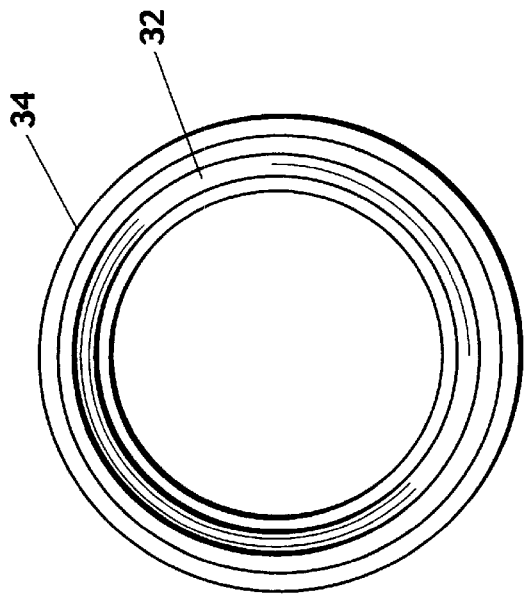
FIG. 7 is a end view taken along section line 7—7 of FIG. 2.
Figure 8:
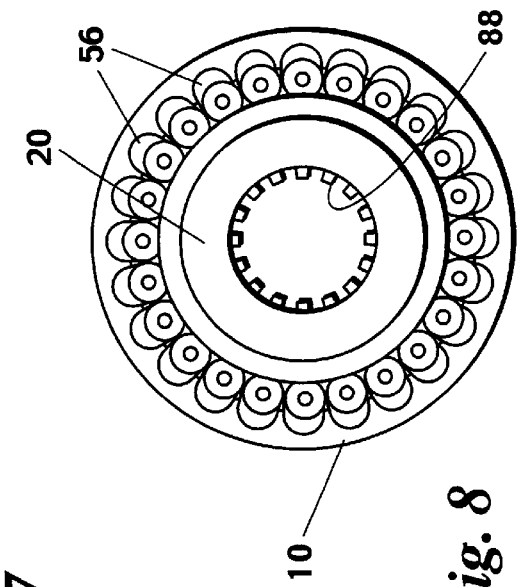
FIG. 8 is a end elevation looking along section line 8—8 of FIG. 2, and showing the bearing at the right-hand end of the worm together with the splined drive connection for the worm.
Figure 6:
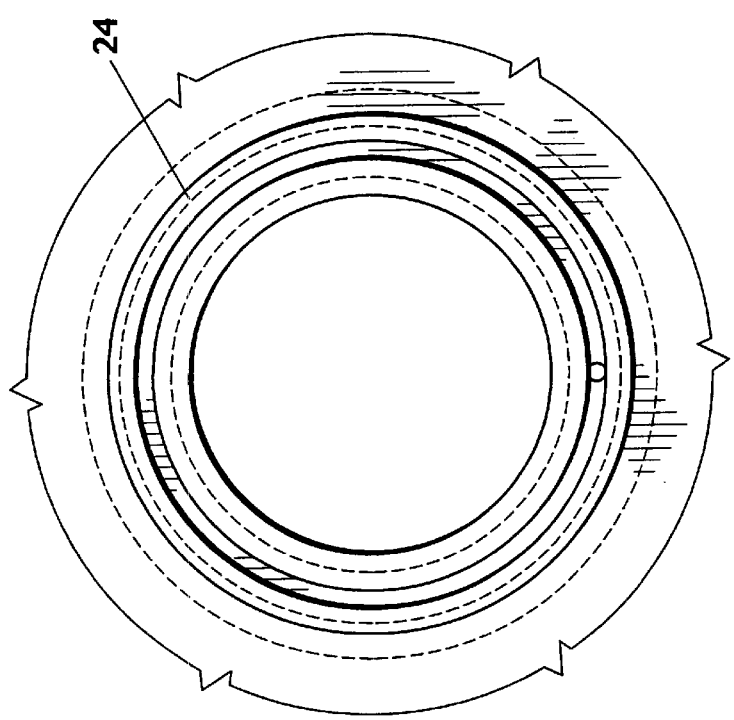
FIG. 6 is a left-hand sectional view, taken along section lines 6—6 FIG. 2.

Actually, the device which is shown in FIG. 1 of the drawings of the present invention could be used to totally replace the device shown in FIG. 5 of U.S. Pat. No. 5,163,570 referred to above. The crane boom (not shown) which picks up loads (also not shown) swings into position in response to the rotation of the vertical crane shaft 14 and the worm gear 12.

The operator of the crane may stop the crane rotation by stopping the rotation of the worm. By virtue of the recognized nature of a worm gear drive, when the worm 10 ceases to rotate, the worm gear is prevented from further rotation. If the load, however, continues to swing the boom around by inertia, the worm gear 12 will exert a force against the worm 10 in the direction of the longitudinal axis thereof. Also, if the worm 10 is rotating so as to rotate the worm gear 12 and, hence, the vertical crane shaft 14, there may be times when the boom is swinging faster or slower than the vertical crane shaft 14 is being driven by the worm 10, in which case a longitudinal force, in one direction or the other, is exerted against the worm 10 by the worm gear 12 in the direction of the longitudinal axis of the worm.

The worm 10 consists of a spirally wound worm tooth 16 disposed on the exterior of a horizontal worm shaft 18, as best shown in FIG. 2. The ends of the worm shaft 18 are provided with two identical reduced cylindrical portions 20 separated from the main portion 18 of the worm shaft by means of shoulders 22. The left and right-hand ends of the worm shaft 18 are received in left and right-hand bearing mounts or blocks 24 and 26 in a manner later to be described. The bearing mounts are supported with respect to each other and the remaining structure by means of a cylindrical sub-housing 28 which is part of a main housing 29 which also surrounds and supports the lower end of the shaft 14 while at the same time providing a housing for the worm gear 12. The main housing 29, which includes the cylindrical sub-housing 28, may consist of a plurality of members which can be bolted together and which can be bolted to the framework (not shown) of the vehicle (not shown) which supports the crane.

Figure 4:
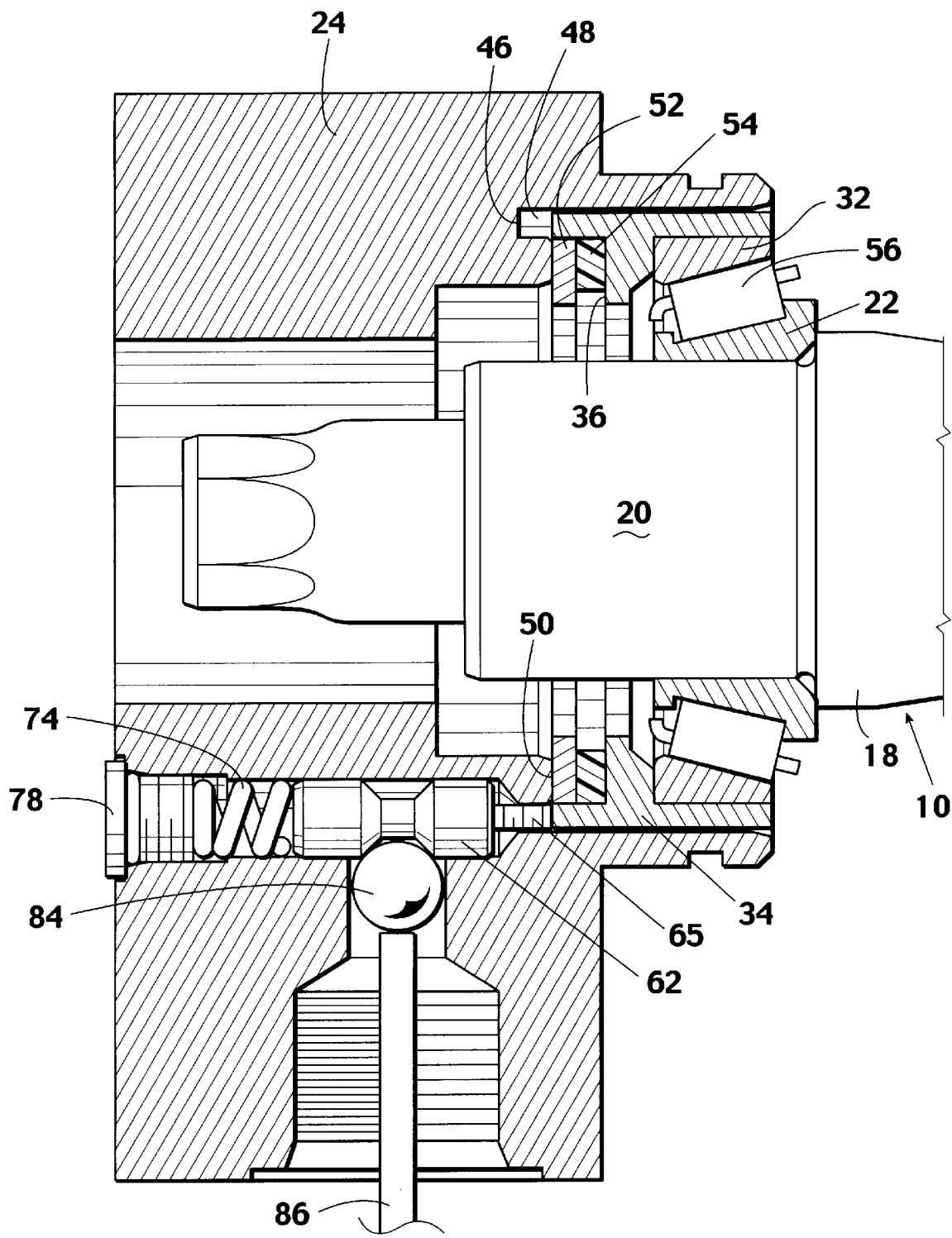
FIG. 4 is a sectional view, taken from FIG. 3, of the left-hand mounting arrangement for the worm.

Referring now to FIG. 2, 3, and 4, the manner in which the left-hand cylindrical portion 20 of the worm 10 is supported in the left-hand bearing mount 24 will be described: It should be understood that the right-hand end 20 of the worm 10 is supported in the right-hand bearing mount 26 in substantially the same manner, and therefore, like parts will be provided with the same numerals. With respect to the left-hand cylindrical portion 20, an inner bearing race 30 is received on the cylindrical portion 20 adjacent to shoulder 22. An outer bearing race 32 is received in the left-hand open end of a sleeve or collar 34. The sleeve 34 has a central circumferential flange 36 which divides the collar into an open end 38 in which the outer bearing race 32 is received and another opposite open end 40 whose purpose will be described hereinafter. The left-hand bearing mount 24 is provided with a cylindrical opening 42 for receiving therein the sleeve 34. The inner end of the cylindrical opening 42 is provided with a circumferential groove 46 which is adapted to receive, at least partially, the inner projecting lip 48 which constitutes the outer circumferential portion of the cylindrical chamber 40. The inner portion of the cylindrical opening 42 is provided with an annular flat surface 50 which projects towards the outside of the bearing member 24 surrounding the groove 46. The surface 50 provides a flat surface against which a pair of washers or rings 52 and 54 may be pressed as will hereinafter appear. The ring or washer 52 is of metal and is preferably of stainless steel. The washer or ring 54, however, is a polyethylene ring which is compressible to a degree and whose compression provides a means for controlling the stopping of the worm rotation when overloading occurs, as will be described hereinafter. The two rings 52 and 54 have an outer diameter which is substantially equal to the inner diameter of the cylindrical recess 40.

The left-hand bearing mount 24 is provided with a horizontal cylindrical bore 60 for receiving therein a slidable spool 62. The spool has a threaded rod 65 received in a threaded opening therein, the threaded rod 65 being adjustable such that, the right-hand end thereof bears against the left-hand edge of the lip 48 on the sleeve 34, for a purpose which will hereinafter appear. The spool 62 is provided with a reduced central portion 64 which connects to the end portions 66 and 68 by a pair of inclined surfaces 70 and 72. When the spool 62 is received in the cylindrical bore 60, a spring 74 is positioned within the opening 60 to the left of the spool 62. A plug 78 is adapted to be screwed into the left-hand threaded end of the bore 60 so as to occupy the position shown in FIGS. 3 and 4.

The left-hand bearing block 24 is also provided with a vertical opening or port 80 having an upper cylindrical portion 82 of a diameter to receive therein a ball 84. The upper end of the vertical opening 82 communicates with the horizontal bore 60 as shown in FIGS. 3, and 4.

As best shown in FIGS. 4 and 5, an actuating rod 86 bears against the lower end of the ball 84. The lower end of the actuating rod 86 connects with a solenoid 87 or other valve whose function it is to turn off the power to the motor 89 for the worm 10 when the ball 84 is moved downwardly as shown in FIG. 5. Additionally, the solenoid 87 (or valve) can actuate an alarm device 91.

As best shown in FIG. 1, the right-hand inner end of the worm shaft 18 is provided with a splined opening 88 which is adapted to receive the end of a driver 90 (shown only in dotted lines). The driver 90 is connected to the motor 89 for the purpose of turning the worm 10 in either direction in accordance with the demands of the system. The manner in which the drive motor for the worm operates is considered conventional and will not be further described herein. It should be understood, however, that the operation of the drive motor 89 will be interrupted when the solenoid or valve 87, actuated by the downward movement of the actuator rod 86, stops this motor in a conventional manner.

Operation

In the relative positions of the elements as shown in FIGS. 3 and 4, the ball 84 is shown as being received centrally with respect to the reduced-diameter portion 64 of the spool.

Turning now to a consideration of FIG. 5, it will be assumed that the worm gear 12 will be urged in a clockwise direction by means of the forces on the boom shaft 14 created by the boom and the load such that the worm 10 will be urged to the left. In this case, the left-hand forces will be transmitted from the shaft 18 through the bearing members 22 and 32 and the bearing 56 to the sleeve 34. The forces will also be exerted by the sleeve 34 against the metal ring 52 and the polyurethane ring 54. These rings will be squeezed between the flat surface 50 at the inner end of the cylindrical opening 42 and the central flange 36 on the sleeve 34. More particularly, the polyurethane ring 54 will be squeezed between the metal ring 52 and the inner surface of the flange 36 of sleeve 34.

When the polyurethane ring 54 is thus slightly compressed, the outer lip 48 of the sleeve 34 will move to the left within the annular groove 46 in the bearing mount 24. Since the edge of the lip 48 bears against the right-hand end of the threaded member 65, the spool 62 will be moved towards the left, such that the central portion of the spool will also move to the left causing the ball 84 to move down the right-hand incline 72 and to move the actuator rod 86 downwardly. The downward movement of the actuator rod 86 will actuate the solenoid or valve so as to shut off the motor 89 which operates the drive 90 to thereby cease rotation of the worm 10.

If the forces were exerted on the worm 10 so as to urge the same towards the right, the right-hand polyurethane ring 54 would be compressed. If it were compressed sufficiently, the lip 48 of right-hand sleeve 34 would move into the right-hand groove 46 in the right-hand bearing mount 26. At the same time, the left-hand sleeve 34 would move correspondingly as a result of its connection to the shaft 18 of the worm 10, and the threaded rod 65 would follow the right-hand movement of the sleeve 34 under the action of the spring 74 so that the spool 62 would be moved to the right from the position shown in FIGS. 3 and 4 to cause the ball 84 to move downwardly (as in the case of FIG. 5) but, as a result of the ball being moved downwardly by the left-hand inclined portion 70 of the reduced center 64 of the spool 62.

If the ball 84 is moved downwardly as result of right or left-hand movement of the worm 10, the result will be the same; i.e. downward movement of the ball 84 will cause a downward movement of the actuator rod 86 which, in turn, will cause actuation of the solenoid or other valve 87 to stop the motor 89 which turns the worm 10. As indicated previously, the actuation of the solenoid or valve 87 can be used to shut off power to any portion of the system, as desired.

The right-hand bearing mount 26 is not provided with a spool mechanism such as the spool 62 for the simple reason that the spool 62 in the bearing mount 24 operates in both directions. However, the bearing member 26 can be of smaller size because it does not require the spool valve. Each bearing member 24 or 26 is provided with an inwardly directed circumferential portion 92 which is adapted to be received within the end openings of the cylindrical sub-housing 28. Each cylindrical member 92 is provided with an O-ring groove 94 in which an O-ring may be received to improve the sealing relation between the bearing members 24 and 26 and the ends of the cylindrical sub-housing 28.

What is claimed is:

1. A side load sensor for sensing a longitudinal load on a rotary worm which turns a worm gear comprising: a gear housing for supporting a worm shaft for rotation about a horizontal axis, the worm being disposed centrally on the worm shaft, the gear housing including a pair of spaced bearing mounts for supporting the ends of the worm shaft, a worm gear disposed for rotation around a vertical axis, a motor for rotating the worm shaft, the worm being arranged in driving relation with the worm gear, a sleeve mounted at each end of the worm shaft for movement with the worm shaft in response to longitudinal forces transferred back from the worm gear to the worm, a polyurethane ring mounted adjacent each end of the worm shaft and disposed between a flat surface on the adjacent sleeve and a flat surface on the associated bearing mount so that a polyurethane ring is compressed between a sleeve and its adjacent bearing mount depending upon the direction of the force exerted by the worm gear against the worm, and means responsive to the compression of the polyurethane ring to sound an alarm signal and/or to shut off the motor which drives the worm shaft when the compression exceeds a predetermined valve.

2. A side load sensor for sensing a longitudinal load on a rotary worm which is used to rotate a turret on a utility vehicle and wherein a boom is mounted on the rotatable turret, comprising: a gear housing for supporting a worm shaft for rotation about a horizontal axis, the worm being disposed centrally on the worm shaft, the bearing housing including a pair of spaced gear mounts for supporting the ends of the worm shaft, a worm gear disposed for rotation around a vertical axis, a motor for rotating the worm shaft, the worm being arranged in driving relation with the worm gear, a sleeve mounted at each end of the worm shaft for movement with the worm shaft in response to longitudinal forces transferred back from the worm gear to the worm, a polyurethane ring mounted adjacent each end of the worm shaft and disposed between a flat surface or the adjacent sleeve and a flat surface on the associated bearing mount so that a polyurethane ring is compressed between a sleeve and its adjacent bearing mount depending upon the direction of the force exerted by the worm gear against the worm, and means responsive to the compression of the polyurethane ring to sound an alarm signal and/or to shut of f the motor which drives the worm shaft when the compression exceeds a predetermined valve.

3. A side load sensor as set forth in claim 2, wherein the means responsive to the compression of a polyurethane ring includes a spool bore in one of the gear housings extending substantially parallel to the longitudinal axis of the worm shaft, a spool mounted for reciprocation in the spool bore, a connection extending from the spool to one of the sleeves such that the spool is reciprocated in the spool bore in response to the compression of the polyurethane ring.

4. A side load sensor is set forth in claim 2, wherein each gear housing is provided with a circumferential groove, wherein each sleeve is provided with a circumferential flange, each circumferential flange being adapted to move into a corresponding circumferential groove when the longitudinal force moves the worm gear in a longitudinal direction, the means responsive to the compression of a polyurethane ring comprising a spool bore disposed substantially parallel to the longitudinal axis of the worm shaft, a spool mounted for reciprocation in the spool bore, the spool having a central depression therein, a bore oriented at right angles to the spool bore and having a ball mounted therein adapted to be received in the depression in the spool, an extension rod attached to one end of the spool and extending through the gear housing into the circumferential groove for engagement with the outer periphery of the circumferential flange, the ball engaging a moveable actuator shaft, whereby, when the worm shaft is moved longitudinally in response to a force exerted by the worm gear against the worm, the spool will move in the same direction as that of the worm shaft with the extension bearing continuously against the edge of the circumferential flange on the sleeve, the movement of the spool forcing the ball out of the recess in the spool and away from the spool so as to move the actuator rod to sound an alarm and/or to shut off the motor which drives the worm shaft.

\* \* \* \* \*